US005604902A

United States Patent [19]
Burkes et al.

[11] Patent Number: 5,604,902
[45] Date of Patent: Feb. 18, 1997

[54] HOLE PLUGGING GARBAGE COLLECTION FOR A DATA STORAGE SYSTEM

[75] Inventors: Theresa A. Burkes, Meridian, Id.; Carl Staelin, San Francisco; Timothy T. Sullivan, Mountain View, both of Calif.; Douglas L. Voigt, Boise, Id.; John Wilkes, Palo Alto, Calif.

[73] Assignee: Hewlett-Packard Company, Palo Alto, Calif.

[21] Appl. No.: 391,429

[22] Filed: Feb. 16, 1995

[51] Int. Cl.$^6$ .................................................. G06F 17/30
[52] U.S. Cl. .......................................................... 395/622
[58] Field of Search ...................................... 395/600, 425, 395/622; 364/DIG. 1, DIG. 2

[56] References Cited

U.S. PATENT DOCUMENTS

| | | | |
|---|---|---|---|
| 4,775,932 | 10/1988 | Oxley et al. | 395/600 |
| 4,797,810 | 1/1989 | McEntee et al. | 395/600 |
| 4,907,151 | 3/1990 | Bartlett | 395/600 |
| 4,924,435 | 5/1990 | Brunvand et al. | 395/437 |
| 4,996,663 | 2/1991 | Nemes | 395/600 |
| 5,025,367 | 6/1991 | Gurd et al. | 395/600 |
| 5,088,036 | 2/1992 | Ellis et al. | 395/425 |
| 5,109,336 | 4/1992 | Guenther et al. | 395/425 |
| 5,155,835 | 10/1992 | Belsan | 395/425 |
| 5,195,100 | 3/1993 | Katz et al. | 371/66 |
| 5,237,658 | 8/1993 | Walker et al. | 395/200 |
| 5,241,673 | 8/1993 | Schelvis | 395/600 |
| 5,247,634 | 9/1993 | Cline et al. | 395/425 |
| 5,278,838 | 1/1994 | Ng et al. | 371/10.1 |
| 5,287,462 | 2/1994 | Jibbe et al. | 395/275 |
| 5,289,418 | 2/1994 | Youngerth | 365/201 |
| 5,297,258 | 3/1994 | Hale et al. | 395/275 |
| 5,339,411 | 8/1994 | Heaton, Jr. | 395/600 |
| 5,392,244 | 2/1995 | Jacobson et al. | 365/200 |
| 5,398,142 | 3/1995 | Davy | 360/48 |
| 5,416,915 | 5/1995 | Mattson et al. | 395/425 |
| 5,463,776 | 10/1995 | Voigt et al. | 395/600 |
| 5,488,701 | 1/1996 | Brady et al. | 395/182.04 |
| 5,542,065 | 7/1996 | Burkes et al. | 395/441 |
| 5,551,003 | 8/1996 | Mattson et al. | 395/463 |
| 5,555,405 | 9/1996 | Griesmer et al. | 395/600 |
| 5,560,003 | 9/1996 | Nilsen et al. | 395/600 |

*Primary Examiner*—Thomas G. Black
*Assistant Examiner*—Maria N. Von Buhr
*Attorney, Agent, or Firm*—Lane R. Simmons

[57] ABSTRACT

A data storage management system performs garbage collection to reduce fragmentation in storage by moving data from source fragmented areas to holes (unused storage space) in target fragmented areas, rather than copying data to the end of an extending target area. New areas are not consumed. Preferably, source areas are emptier (i.e., more fragmented) relative to the whole set of areas in the storage system, and target areas are fuller (i.e., less fragmented) relative to the whole set of areas in the storage system. The goal of freeing (defragmenting) an area is realized with fewer I/O moves, if most areas are lightly fragmented, because fragmentation is reduced in more than one area substantially concurrently. Namely, fragmentation is eliminated in a source area by continuing to empty the area (i.e., by moving the data from the source area) and, substantially concurrently, fragmentation is reduced in a target area by continuing to fill the area (i.e., by moving/plugging the data into holes in the target area). In a lightly fragmented storage, this reduction in moves outweighs the increased cost incurred for read-modify-write in parity storage, thereby providing better overall garbage collection efficiency and performance.

20 Claims, 4 Drawing Sheets

HOLE PLUGGING GARBAGE COLLECTION FOR A DATA STORAGE SYSTEM

FIELD OF THE INVENTION

This invention relates, in general, to computer data storage management and, in particular, to reducing fragmentation in data storage.

BACKGROUND OF THE INVENTION

In the computer industry, memory devices such as hard and floppy disks and Random Access Memory (RAM) provide a common means for storing computer information. Space is allocated in and data is stored to and retrieved from these storage media through hardware and software adapted for that purpose. Contiguous free storage space generally provides optimum performance in such memory devices.

An insufficient amount of contiguous space is often the result of storage space having become fragmented. Fragmentation generally exists when only separate, discrete blocks of free storage space are available for use (usually in a randomly scattered fashion across the storage space), rather than a large contiguous block of storage space being available for use. Alternatively, fragmentation exists when use of a given storage area is not in compliance with specified storage management criteria. In particular, fragmentation can result when data is moved within the storage system in units smaller than can be allocated on the storage media within the context of the data storage system.

Two major problems arise with data being fragmented on disk drives and other storage media. First, some requests for space cannot be satisfied. Second, separate processing must occur to defragment the storage (commonly referred to as garbage collection) in order to create more allocatable free space from the fragments of free space that are scattered across the storage system.

Fragmentation also occurs where a plurality of disk storage devices are used together in what is commonly known as a Redundant Array of Independent Disks (RAID or disk array). However, fragmentation in disk arrays presents a more complex management issue due to the various data redundancy schemes that may be employed in the array.

Essentially, there are two common types of disk array data redundancy schemes: (1) mirror sets, in which two or more member disks contain identical images of data, and (2) stripe sets, which interleave data and redundant (parity) data on three or more member disks. From a data management and data redundancy perspective, these broad categories are further identified with differing RAID Levels. For example, the use of disk mirroring is referred to as RAID Level 1, and parity checking as RAID Levels 2, 3, 4, 5, and 6. Although RAID 1 provides the highest data reliability and may provide the best small-write Input/Output (I/O) performance, it uses the most storage space because all data is duplicated. In contrast, RAID Levels 2–6 provide a lesser amount of data reliability (relative to RAID 1) and, typically, reduced small-write performance. However, they don't consume as much disk space as a RAID 1 technique because data is not duplicated but rather interleaved and parity checked across the disk array in a stripe set.

The parity stripe set presents a single virtual disk whose user data capacity is approximately the sum of the capacities of its members, less the storage used for holding the parity (redundant) data of the user data. The mirror set presents a single virtual disk whose user data capacity is the sum of the capacity of one-half of its members, the other half holding the mirrored (redundant) data of the user data.

For example, RAID level 4 uses a stripe set and a dedicated parity disk to store redundant information about the data existing on the several data disks in the disk array. Segments of data from each virtual disk sector are distributed across corresponding sectors of all but one of the array members (i.e., the parity disk), and the parity of the distributed segments is written in the corresponding sector of the parity disk. Parity is commonly calculated using a bit by bit Exclusive OR function of corresponding data chunks in a stripe set from all of the data disks.

RAID level 5 is similar to RAID 4 in that data is striped but is dissimilar in that the redundant information is distributed across all disks in the array rather than on a dedicated parity disk. Although RAID 5 data reliability approaches that of mirroring there is a substantial performance penalty compared to a single disk when data is written in units smaller than a whole strip or not aligned on stripe boundaries. This write performance penalty also exists in RAID 4.

This write performance penalty is due in part to the read-modify-write overhead associated with calculating and storing the parity of the data. Specifically, whenever data is newly written to a stripe in a disk array that already contains data, the existing parity in the stripe must be read in order to calculate (modify) and write the new parity. Because of this read-modify-write parity storage overhead, present defragmentation schemes generally move data from one fragmented location to a stripe that the system is currently extending. One of the reasons for doing this is to be able to cache the parity of the stripe and avoid some of the read-modify-write overhead of parity writes. Another reason is that prior art teaches that this method is best for maintaining large free storage areas for fast writing. See, Rosenblum, Mendel and John K. Ousterhout. "The Design and Implementation of a Log-Structured File System." (Computer Science Div., Dept. of Electrical Engineering and Computer Science, Univ. of California, Berkeley: ACM, 1991); and de Jorge, Wiebren, M. Frans Kaashoek, and Wilson C. Hsieh. "The Logical Disk: A New Approach to Improving File Systems." (Proceedings of 14th ACM Symposium on Operating Systems Principles, Asheville, N.C.: Dec. 5–8, 1993) 15–28.

Although RAID 2–6 parity checking generally provides more efficiently used storage space than RAID 1 mirroring, the problem of disk fragmentation remains common in all. Moreover, fragmentation is also inevitable in memory hierarchy systems or systems that move data between multiple storage types. For example, fragmentation commonly occurs when data is deleted or migrated to another redundancy type in a memory hierarchy system, or to another storage medium, such as tape.

A memory hierarchy system employs the simultaneous use of multiple data redundancy schemes and/or storage types to optimize and improve data storage system cost, performance, and reliability. A memory hierarchy system may include a RAID management system operatively coupled to a disk array controller for mapping two virtual storage spaces into the physical storage space of the storage disks. A RAID-level virtual storage space presents the physical storage space as mirror and parity RAID areas, for example, that store data according to RAID Level 1 (mirror redundancy) and RAID Level 5 (parity redundancy). An application-level virtual storage space presents the RAID-level virtual storage space as multiple virtual blocks. The memory hierarchy system moves virtual blocks between the mirror and parity RAID areas so that data undergoes a change in redundancy between RAID Level 1 and RAID Level 5, or vice versa. The process of moving data between the mirror and parity RAID areas, or between storage types, is referred to as "migration"

A memory hierarchy system "tunes" the storage resources of the data storage system according to a function of two parameters: size of the physical storage capacity and size of the present amount of user data being stored in the data storage system. Initially, all data is stored in mirror RAID areas because this affords the highest performance and reliability. As more data is added to the storage system, the data is migrated between mirror RAID areas and parity RAID areas to optimize performance and reliability. As the data storage system approaches full capacity, more and more data is migrated to parity RAID areas in an effort to meet all demands by the user while still providing reliability through redundancy. Accordingly, maximum flexibility and adaptation is provided, and it is not required that a user select a specific storage regime; but, instead, the system dynamically adapts to any demand placed on it by the user.

The importance of memory hierarchy systems relative to this disclosure is that fragmentation inevitably occurs when blocks are migrated from one data redundancy type to another (for example, between parity and mirrored) or from one physical storage type to another (for example, between disk and tape, or between media with different performance characteristics). For example, holes are created in parity storage if a block is moved (migrated) to mirrored storage. Similarly, holes may be created in mirrored storage when blocks are migrated to parity storage. In order to free up at least one stripe that can be allocated as either mirrored or parity storage for the purposes of migration, it is particularly important that fragmentation issues be managed on a continuous basis. Other candidates for the improved hole-plugging garbage collection method of the present invention include any storage hierarchy, such as memory and disks; a log-structured file system; large, slow storage versus small, fast storage; disk and tape; or any combinations of these.

Given the ever increasing use of data and the inevitable fragmentation of data storage space (particularly in memory hierarchy systems) and given the cost, performance, and reliability benefits provided by memory hierarchy systems, there is a striking need for improved defragmentation capabilities. Accordingly, objects of the present invention are to provide an improved storage management system and method for defragmenting data storage.

SUMMARY OF THE INVENTION

According to principles of the present invention in its preferred embodiment, a storage management system performs garbage collection to eliminate fragmentation in storage by moving data from source fragmented areas to holes (unused storage space) in target fragmented areas, rather than copying data to the end of an extending target area as commonly occurs in the art. Under the present invention, new areas are not consumed. Alternatively, the present invention is used in conjunction with prior art methods depending on the degree of fragmentation of most areas in the system. For example, in a lightly fragmented parity disk system, most areas are at most 45% fragmented. It is a case such as this that benefits from the present invention. The efficiency breakeven point will be different for different types of storage, but for fragmentation percentages of about 45% or less, fewer I/Os are needed under principles of the present invention.

According to further principles of the present invention, in a lightly fragmented storage system, source areas selected are emptier (i.e., more fragmented) relative to the whole set of areas in the storage system, and target areas are fuller (i.e., less fragmented) relative to the whole set of areas in the storage system. Alternately, source or target fragmented areas are randomly selected. In each case, the goal of freeing (defragmenting) an area is realized with fewer I/O moves than occurs in common defragmenting techniques, if most areas are lightly fragmented, because fragmentation is reduced in more than one area substantially concurrently. Namely, fragmentation is reduced in the source area by continuing to empty the area (i.e., by moving the data from the source area) and, substantially concurrently, fragmentation is reduced in the target area by continuing to fill the area (i.e., by moving/plugging the source data into holes in the target area). If fragmentation is light, this reduction in moves outweighs the increased cost incurred for read-modify-write in parity storage, thereby providing better overall garbage collection efficiency and performance.

According to further principles in a preferred embodiment, source and target areas are selected by using a frequency distribution table for avoiding processor overhead of scanning and sorting for selection purposes.

Other objects, advantages, and capabilities of the present invention will become more apparent as the description proceeds.

DETAILED DESCRIPTION OF THE INVENTION

Figure 1:
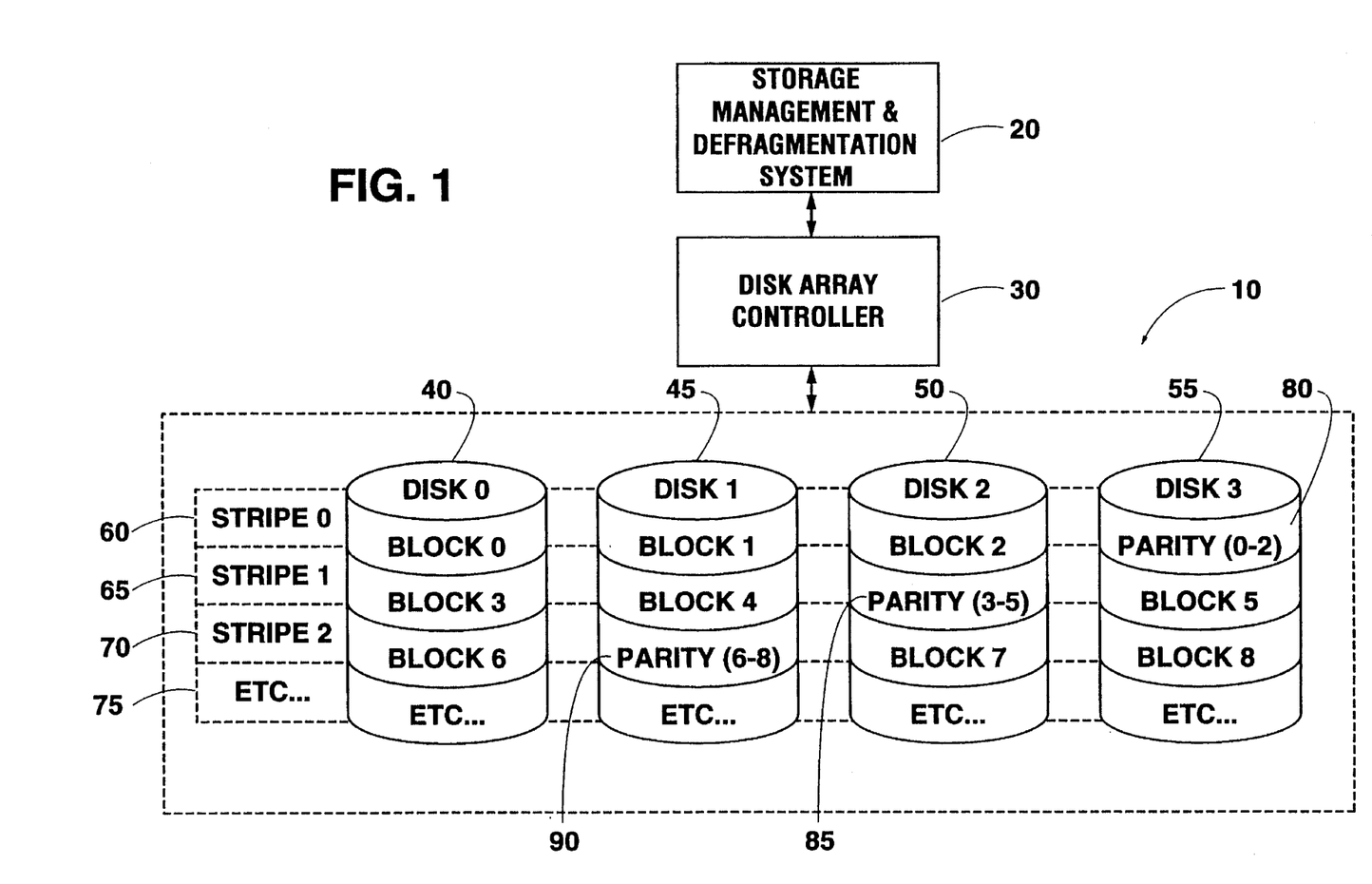
FIG. 1 is a block diagram of a parity disk array storage management system for defragmenting storage space according to the present invention.

FIG. 1 is a block diagram of a parity disk array 10 and storage management system 20 for defragmenting storage space according to the present invention. Storage management and defragmentation system 20 includes computer hardware and software for operatively communicating with disk array controller 30, and for defragmenting disk array 10 according to principles of the present invention. Controller 30 operatively communicates between defragmentation system 20 and disk array 10.

In this depicted embodiment, disk array 10 comprises four physical disk drives 40, 45, 50, and 55 (disks 0–3) which are presented to a system user as one virtual drive. It is understood that disk array 10 could easily include any number of disk drives as is common in the art, but for simplicity purposes, only four disks are shown here. Also, the virtual drive may be multiple virtual drives. Furthermore, in memory hierarchy systems, there is no strict mapping between the physical disks and virtual disks because the mapping is dynamic.

Disk array 10 is shown as a Redundant Array of Independent Disks (RAID) using the storage management and data redundancy technique commonly known as RAID Level 5. Although RAID 5 is described here for simplicity purposes, the present invention system is equally applicable to other parity storage data redundancy techniques, such as RAID Level 4. Similarly, the present invention is equally applicable to memory hierarchy systems, including those employing multiple data redundancy techniques wherein parity redundancy is included and memory hierarchy systems employing multiple different physical storage types.

As previously discussed, RAID level 5 distributes and manages data across the disk array in stripe sets (areas), as shown at 60, 65, 70, and 75, and the disks operate independently of each other. Redundant (parity) information is distributed across all disks in the array, as shown at 80, 85, and 90, rather than on a dedicated parity disk. For example, the parity calculation for stripe 0, for blocks 0, 1, and 2 of their respective disks, is stored on disk 3 shown at 80. In this simplified diagram, each disk is shown as having only one block per stripe set although other variations of multiple blocks could equally be employed. A block is defined as 64K bytes in this embodiment although, likewise, other variations could also be used.

As data is written to and deleted from each stripe set 60, 65, 70, and 75 during normal use or as data is migrated to another storage media or data redundancy type, it is easy for the stripes to become fragmented. For example, for stripe 0 (60) it may be that data is only written in block 0 of disk 0 (40) and block 2 of disk 2 (50), but no data is written in block 1 of disk 1 (45). The parity, of course, is always written to parity block 80 on disk 3 (55). In this case, the data is fragmented across stripe 0 leaving an unused block 1 on disk 1 (45). This unused storage space is referred to as a "hole" because it is an available block of storage space residing among the used blocks of storage space ("used block" meaning a block containing valid data or data that is still valid for access by the user). Stripe 0 is fragmented because of this hole existing in the stripe with the used blocks of data. Namely, the stripe is fragmented when some used blocks and some unused blocks (holes) exist in the stripe.

Stripe 2 (70) may also be fragmented similar to stripe 0, although the location of used blocks and unused holes may differ from stripe 0. Similarly, different stripes may be more or less fragmented throughout disk array 10.

One of the novel aspects of this invention is how management system 20 defragments parity storage array 10. Specifically, this system defragments array 10 by selecting a fragmented source stripe 60, selecting a fragmented target stripe 70 (or multiple target stripes), and then moving all the data blocks from the source stripe into the holes of the target stripe(s). The source stripe is defragmented by having all used data blocks moved into the target stripe(s). At the same time and as a clearly novel advantage, the target stripes are also defragmented by having their holes plugged/filled with the data blocks from the source stripe. In essence, both the source and target stripes are defragmented substantially concurrently, and the degree of defragmentation of the target stripe depends upon how many data blocks are moved into the target stripe. The cleaning of enough source stripes to completely defragment the target allows for the parity calculations for the target stripe(s) to be cached, thus generally improving efficiency and I/O performance. For simplicity purposes, the diagram only shows one fragmented source stripe 60 and one fragmented target stripe 70. However, the present invention is equally applicable to a storage system wherein multiple source stripes and multiple target stripes are selected for defragmentation purposes.

This concurrent defragmentation is accomplished with fewer I/O moves than is normally required under other defragmentation systems for parity disk arrays. Prior art systems only defragment one stripe at a time by moving data from a source fragmented stripe into a newly extending target stripe, rather than another fragmented target stripe. Prior art systems have taught away from concurrent defragmentation as accomplished by the present invention because of the read-modify-write overhead burden associated with parity calculations in a parity storage array and because the method of extending a target area was thought best for maintaining large free storage areas for fast writing (see Background Of The Invention herein for a more detailed discussion of read-modify-write). However, contrary to prior art teachings, simulation and analysis have shown that the reduction in I/O moves associated with this concurrent defragmentation generally outweighs the increased cost incurred for read-modify-write in parity storage when storage is not heavily fragmented (i.e., most areas are not more than about 45% fragmented). Accordingly, garbage collection efficiency and performance is improved by the present invention.

Although the advantages of the present invention system and method are especially obvious in a parity storage array, it is also apparent that the present invention is equally applicable and beneficial in other storage management systems. For example, substantially concurrent defragmentation of two separate storage areas (not necessarily "stripe" areas) by hole plugging is equally beneficial in any lightly fragmented storage system, e.g., a single disk system, a mirrored system, or a non-parity system. The present invention is especially applicable in a hierarchic data storage system where data is migrated back and forth between storage data redundancy types, e.g., a mirror data redundancy area (or some other type) and a parity redundancy area or between differing physical media storage types. In such a system, fragmentation inevitably occurs, and the present invention provides an extraordinary defragmentation benefit whereby a whole area is freed up to be used as the hierarchic system deems appropriate.

Figure 2:
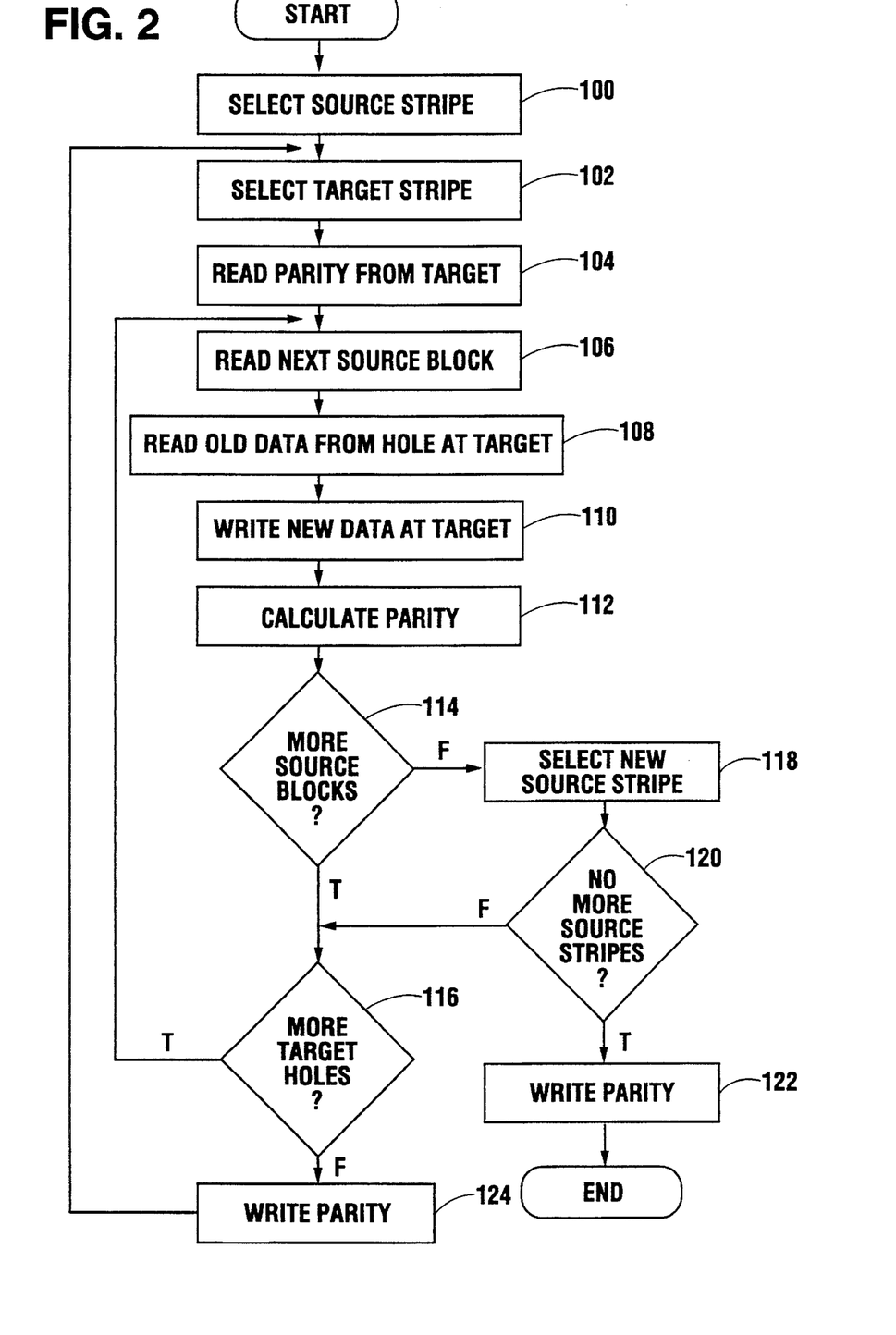
FIG. 2 is a flow chart depicting steps for defragmenting fragmented storage space in a parity disk array according to the present invention.

Referring now to FIG. 2, a flow chart depicts the method for defragmenting storage space in a lightly fragmented parity disk array 10 (FIG. 1) according to the present invention storage management and defragmentation system 20. Although any defined storage "area" can be referenced for defragmentation purposes, a parity disk array stripe is used in this discussion with FIG. 2, and parity is calculated at the stripe level. Furthermore, it is well understood that multiple stripes may similarly be selected and referenced as an area, rather than just a single stripe.

First, 100, a source fragmented stripe is selected which needs to be defragmented. Next, 102, a target fragmented stripe is similarly selected. A stripe is deemed fragmented for selection purposes if some blocks are used and some are unused. The stripe is considered not fragmented if it is either full (all blocks used) or empty (no blocks used), In a preferred embodiment, relative to the whole set of stripes in the storage system, an emptier, fragmented stripe (i.e., one that has a lower use count of used data blocks) is selected as the source stripe. Conversely, relative to the whole set of stripes in the storage system, a fuller, fragmented stripe (i.e., one that has a higher use count of used data blocks) is selected as the target stripe. Alternatively, an emptier stripe is selected as the source, but any fragmented stripe other than the source is selected as the target. This second variation is simpler to implement than the first since processing overhead is then avoided when selecting the target.

Any method common in the art may be used for source/target selection purposes. Although a preferred embodiment utilizes a frequency distribution table as described and detailed later in reference to FIG. 3, it is by no means the only solution. For example, a workable solution simply sorts the stripes by fragmentation percentage to select the source and target. Fragmentation percentage is the ratio of holes to total blocks that can be used in the area, multiplied by 100. A logical table identifies for each stripe the blocks used and holes to be filled, and the table is sorted and referenced sequentially for selection purposes. However, the processing overhead of this method is prohibitive.

Alternately, a percentage fragmentation threshold may be used. Namely, if an area meets certain fragmentation threshold criteria, such as being at least two-thirds (⅔) fragmented (i.e., two out of three blocks are unused), then it is considered to be an emptier stripe for source selection purposes. In contrast, any stripe whose fragmentation percentage is less than the threshold is considered a fuller stripe for target selection purposes. One way to establish a fragmentation percentage threshold is to compare the cost of moving all blocks from the source stripe of any given fragmentation area against the number of free blocks the system will gain from freeing the stripe. The system uses the fragmentation percentage that gives the greatest gain per cost. This method, though, skips fuller areas that may also be good source areas when using hole-plugging.

Although it is not the intent of this disclosure to discuss all source/target area selection options and/or methods, it is the intent to relate that a frequency distribution table (as defined in reference to FIGS. 3 and 4) is the preferred method and that there are numerous other methods available in the art.

Referring again to FIG. 2, after the source/target stripes are selected, the target parity is read 104 in preparation for calculation of the new parity in connection with the source blocks to be plugged into the target holes. Then, the next source block is read 106, and the old data remaining in the hole at the target stripe is also read 108. Data remains in the hole of the target simply because it is more efficient to not zero it out at the time when the data is removed or deleted. Accordingly, the hole data remains in the hole, and the parity for the target stripe remains unchanged. As such, the hole data is read 108, and the new data block (as read from the source) is written to (plugged into) the target hole 110. Subsequently, a new target parity is calculated in a non-volatile cache 12.

If more data blocks are to be moved from the source stripe 114 and more target holes exist to receive them 116, then the previous steps 106, 108, 110, and 112 are repeated until at least one of conditions 114 or 116 is false. Once all blocks have been moved from the source stripe, a new source stripe is selected 118, and if no more source stripes exist to defragment 120, then the target parity calculation is written to the target stripe 122 and defragmentation of the target stripe is completed.

Determination of whether more source stripes exist to be selected 120 depends on various options. For example, if a free space threshold has been met, then no more source stripes are selected because defragmentation needn't continue. Similarly, in a memory hierarchy system, all migration needs may be met whereby no further defragmentation need occur. Likewise, the storage system may be completely defragmented such that no more fragmented stripes exist to be defragmented.

However, if more source stripes exist 120, but no more target holes exist 116, then the target parity calculation is written to the target stripe 124 and a new target stripe is selected 102. Similarly, if more source blocks exist 114, but no more target holes exist 116, then the parity is written to the target stripe 124 and a new target stripe is selected 102. In this context, multiple target stripes may be selected if a first target stripe has fewer holes than the source has blocks to be moved.

Consequently, regardless of the alternate flow options identified in the diagram, a source stripe is defragmented by being completely cleaned out (zeroed out) and freed up, and the target is defragmented by having at least some holes plugged. Furthermore, it should be noted that the method of leaving data in a hole or zeroing it out is not germane to the invention, as either may be used. Moreover, the flow in FIG. 2 is not the only implementation. For example, the system can do some operations in parallel.

Figure 3:
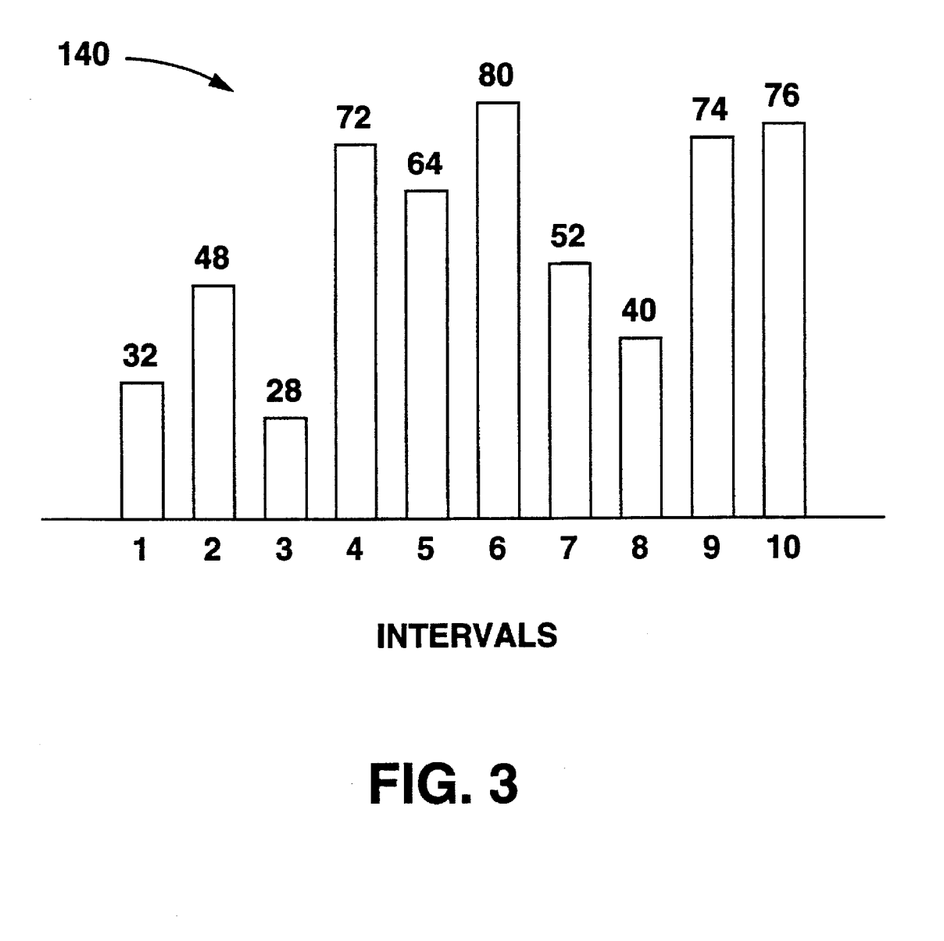
FIG. 3 is a frequency distribution table depicted in statistical bar graph representation as used for selection of fragmented areas.
Figure 4:
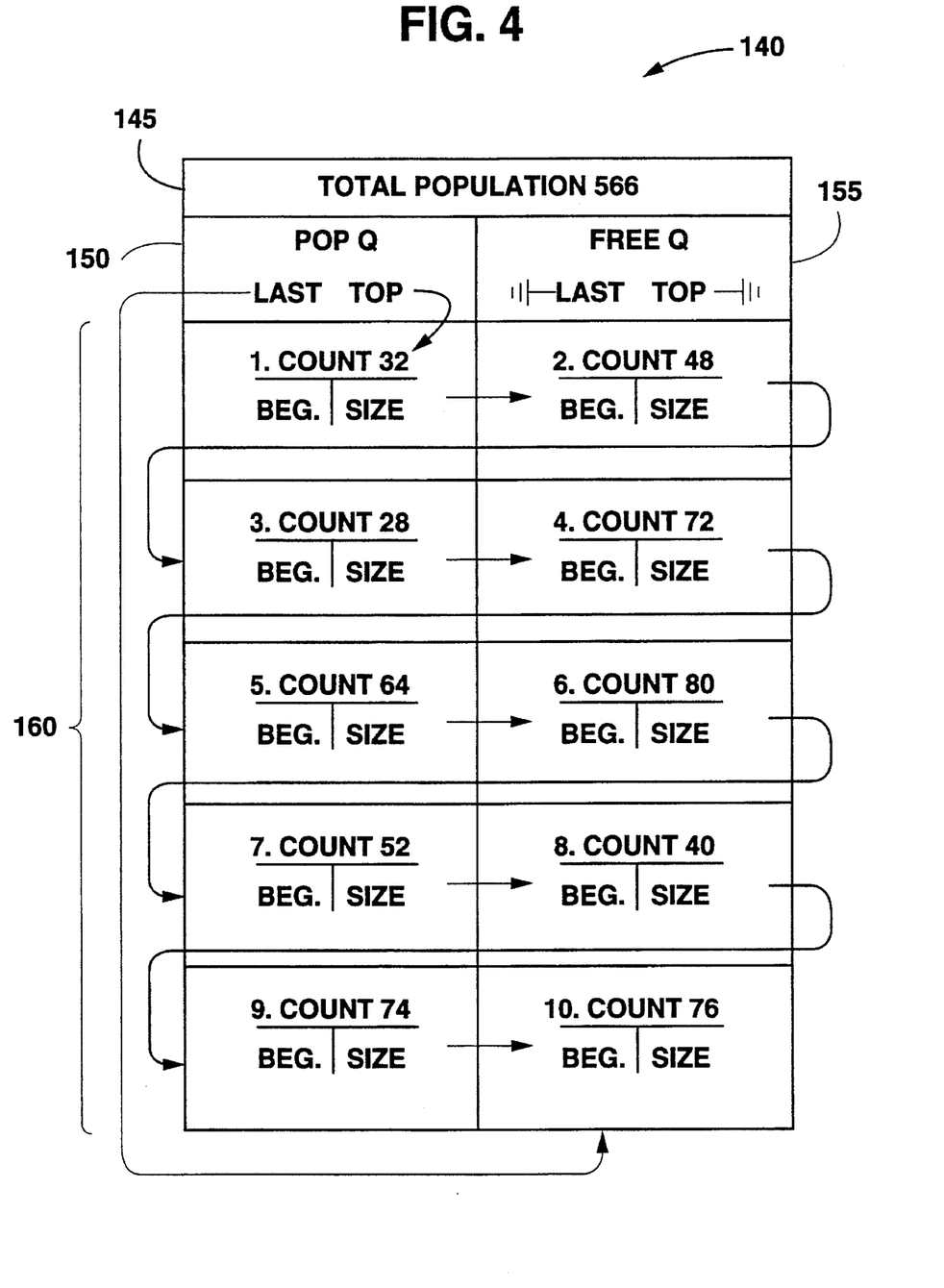
FIG. 4 is the frequency distribution table of FIG. 3 in a memory format representation.

Referring now to FIGS. 3–4, FIG. 3 illustrates a frequency distribution table 140 in a bar graph format, and FIG. 4 illustrates the same table in a memory format conceptualization. A frequency distribution table is a table of frequencies of values falling within some ranges of values. Frequency distribution table 140 statistically characterizes the data stored on data storage system 10 according to a predetermined distribution criteria. The application of a frequency distribution table in this invention is to characterize areas according to their fragmentation percentage, hole count, use count, or other figure of merit that is a function of fragmentation, perhaps in conjunction with some other value, for source/target area selection purposes. An example of a figure of merit is a value (or values) that weighs fragmentation with the ages of the blocks in the area. The table makes the characterization at the level of space management units that are at least one stripe in size (in reference to FIG. 1 ). The table contains statistical information about areas across storage system 10 and is used, for example, to select the emptier or fuller (source or target) areas relative to the entire set of stripes in the array.

Use count, hole count, and percentage fragmentation each represent a different way of saying essentially the same thing relative to the area. Namely, a use count identifies the number of used blocks, a hole count the number of holes, and percentage fragmentation is simply a percentage derived from the hole or use count. Source and target areas are each selected using one of these three methods or using some other figure of merit. However, for ease of discussion purposes, the remainder of this disclosure will simply refer to use count for source/target selection purposes.

The use of a frequency distribution table (or tables) is advantageous because the data storage system need not scan and sort all areas to select the most or least fragmented areas from the set of all areas in the storage system. Rather, the data storage system efficiently maintains the table and easily identifies a selection criterion for selecting candidates for defragmentation and uses the criterion to select candidates from a subset of the population of areas having a sufficient number of candidates for defragmentation. The process can be halted early upon locating enough areas to satisfy the selection request. Considerable efficiency is gained through this technique.

Frequency distribution table 140 is preferably bounded with a fixed number of intervals. An example number of intervals is ten, as shown in FIGS. 3 and 4. The intervals are labeled generically as 1–10, but such intervals actually consist of a range of values from a beginning boundary value to an ending boundary value. If the distribution criteria is use count, the intervals relate to used blocks where each interval covers a range of used blocks associated with the areas whose used block count falls within that range.

The table contains the number of areas that occur within each interval. This is represented by the vertical bars and associated counts in FIG. 3. For example, thirty-two areas have a use count that falls within interval 1; forty-eight areas have a use count that falls within interval 2; and so on. The table also tabulates a cumulative count or total number of areas to define the entire population. In this case, the total population consists of 566 areas.

In FIG. 4, frequency distribution table 140 contains a first field 145 which stores the total population of 566. The table also contains a population queue 150, a free queue 155, and ten interval fields 160. Population queue 150 maintains the interval elements for the current population whereas free queue 155 tracks the unused interval elements. Each interval field 160 contains the count for the associated interval (i.e., thirty-two for interval 1, forty-eight for interval 2, and so on), the beginning boundary value, and the size of the interval. From the beginning boundary value and the interval size, the ending boundary value can be readily computed.

The frequency distribution table is created during system initialization by scanning the areas contained in the array. In the beginning, population queue 150 is empty, and free queue 155 contains ten unused interval elements. The count and beginning boundary value for all ten interval fields 160 default to zero. The size for each interval field is initialized to a default size. The table is then statistically constructed based upon the use count of the areas. The number of areas satisfying each interval is counted and input to the appropriate interval field 160.

The use count for each area is sequentially checked (as indicated by the arrows in FIG. 4) against the interval fields 160 until a match occurs. For example, assume that the area had a use count that fell within the interval in the third interval field. The use count would first be evaluated against the interval in the first interval field. Since the area falls outside this interval field, it is next compared to the second interval field. It is noted that each interval field contains pointers to direct analysis to the address for the next interval field. The process continues field by field until the use count is compared and found to fit in the appropriate interval field (which in this case, is the third interval field), whereupon the count for that interval field is incremented. By maintaining top and last interval pointer values, the population queue 150 can readily find and point to the top and last interval fields 160.

As areas are scanned and the statistical information extracted, population queue 150 begins to fill and free queue 155 begins to empty. When the table contains a count in each interval, the free queue 155 will be empty (as denoted by the null or ground symbols in the free queue).

When the system moves a virtual block or services a client data request that uses a previously unused virtual block or services a client data request to delete a previously used virtual block, it adjusts the frequency distribution by decrementing and/or incrementing the appropriate frequency counts. When the system initiates garbage collection, the frequency distribution is used to derive a range of use counts for selecting candidates for the source or target of the garbage collection process. The range is the smallest interval that can be derived from the table which also contains the desired segment of the population. The desired segment is represented as a number from 1 to the number of segments. Segment 1 of a table of use count frequencies represents the emptiest segment. A segment number equal to the number of segments represents the fullest segment.

To compute the segment size, the population total (of blocks) is divided by the number of segments. The table is then scanned accumulating frequency counts of the scanned intervals until it reaches an interval in which the accumulated count is greater than or equal to the start of the requested segment. The interval at this point is the starting interval of the requested segment. The scan continues until the accumulated count is greater than or equal to the end of the requested segment. The range size is then computed from the start of the starting interval, the start of the last interval scanned, and the size of the last interval scanned.

This use of a frequency distribution table, and the maintenance of such as described, provides a more efficient system for selecting source and/or target areas for defragmentation purposes, as compared to conventional scanning and sorting of the areas.

In summary, frequency distribution table 140 is defined to be a table of fixed-sized sample intervals 160 that lists the interval boundaries, tabulates the frequency in which the population of stripes falls within each interval, and also tabulates the cumulative frequency for the entire population. If the intervals represent increasing values for the number of used blocks in fragmented stripes (or the inverse of the number of holes), the emptiest segment of the population can be defined as the 1/n part of the population that is accounted for in the tabulations for the intervals of lowest values, where n can be any positive integer. Similarly, the fullest segment of the population can be defined as the 1/n part of the population that is accounted for in the tabulations for the intervals of highest values.

Furthermore, the size of the table is bound (limited) to reduce processing time, but a small enough default range size is chosen to allow maximal flexibility in determining the emptiest or fullest segments of the population. Accordingly, when a source or target area needs to be selected for garbage collection, the frequency distribution table is used to determine the use count (or hole count or fragmentation ranges) of the emptiest and fullest segments of the population. Those ranges are then used for selecting the most optimal garbage collection source/target areas. Finally, it should be noted that the frequency distribution table can be implemented in a number of equivalent ways. For example, it can be implemented as a fixed size array with index variables.

What has been described above are the preferred embodiments for a storage management and garbage collection system. It is clear that the present invention provides a powerful tool for significantly improving the defragmentation of data storage, and especially those using parity storage or memory hierarchy schemes. Moreover, it will be obvious to one of ordinary skill in the art that the present invention is easily implemented utilizing any of a variety of hardware platforms and software tools existing in the art. While the present invention has been described by reference to specific embodiments, it will be apparent that other alternative embodiments and methods of implementation or modification may be employed without departing from the true spirit and scope of the invention.

What is claimed is:

1. A storage management system for defragmenting storage space in a data storage system, comprising:

(a) selection means for selecting from the storage space at least one source fragmented area-having first blocks of data therein, and at least one target fragmented area having second blocks of data therein and holes of unused storage space, and wherein the source and target fragmented areas are separate areas in the storage space; and, (b) means for moving the first blocks of data into the holes to fill the holes, whereby the source and target fragmented areas are each defragmented substantially concurrently.

2. The storage management system of claim 1 wherein each area is at least one stripe set in a Redundant Array of Independent Disks (RAID).

3. The storage management system of claim 1 wherein the source area is one of the most fragmented within a set of all areas in the storage space, and the target area is one of the least fragmented of the set of areas.

4. The storage management system of claim 1 wherein the selection means includes a frequency distribution table for characterizing the storage space according to a predetermined distribution criteria and for selecting storage space for defragmentation purposes, whereby scanning and sorting overhead for storage space selection purposes is reduced.

5. The storage management system of claim 4 wherein the frequency distribution table comprises a set of interval elements for identifying subsets for a total number of areas of storage space in the data storage system, and wherein the subsets of areas are identified by selection criteria, and wherein the selection criteria are selected from the group consisting of block use counts, hole counts, fragmentation percentages, and values that are functions of fragmentation percentages.

6. The storage management system of claim 1 wherein all the first blocks in the source fragmented area are moved to the target fragmented area.

7. The storage management system of claim 1 wherein all the first blocks are moved from at least one of the source fragmented areas to at least one of the target areas.

8. The storage management system of claim 1 wherein the data storage system includes a memory hierarchy system selected from the group consisting of (i) multiple data redundancy schemes, including parity storage redundancy, and (ii) multiple physical media storage types.

9. A method for defragmenting storage space in a data storage system, comprising the steps of:

(a) selecting from the storage space at least one source fragmented area having first blocks of data therein;

(b) selecting from the storage space at least one target fragmented area having second blocks of data therein and holes of unused storage space, and wherein the source and target fragmented areas are separate areas in the storage space; and, (c) moving the first blocks of data into the holes to fill the holes, whereby the source and target fragmented areas are each defragmented substantially concurrently.

10. The method of claim 9 wherein each area is at least one stripe set in a Redundant Array of Independent Disks (RAID).

11. The method of claim 9 wherein the source area is one of the most fragmented within a set of all areas of the storage space and the target area is one of the least fragmented of the set of areas.

12. The method of claim 9 wherein the source and target areas are selected using a frequency distribution table for characterizing the storage space according to a predetermined distribution criteria and for selecting storage space for defragmentation purposes whereby scanning and sorting overhead for storage space selection purposes is reduced.

13. The method of claim 12 wherein the frequency distribution table comprises a set of interval elements for identifying subsets for a total number of areas of storage space in the data storage system, and wherein the subsets of areas are identified by selection criteria, and wherein the selection criteria are selected from the group consisting of block use counts, hole counts, fragmentation percentages, and any value that is a function of fragmentation percentages.

14. The method of claim 9 wherein all the first blocks in the source fragmented area are moved to the target fragmented area.

15. The method of claim 9 wherein all the first blocks are moved from at least one of the source fragmented areas to at least one of the target areas.

16. The method of claim 9 wherein the data storage system includes a memory hierarchy system selected from the group consisting of (i) multiple data redundancy schemes, including parity storage redundancy, and (ii) multiple physical media storage types.

17. A method for defragmenting storage space in a storage system having a memory hierarchy, comprising the steps of:

(a) selecting from the storage space at least one source fragmented area having first blocks of data therein;

(b) selecting from the storage space at least one target fragmented area having second blocks of data therein and holes of unused storage space, and wherein the source area is one of the most fragmented within a set of all areas in the storage space and the target area is one of the least fragmented of the set of areas; and, (c) moving all the first blocks of data into the holes to fill the holes, whereby fragmentation is reduced in the source and target areas substantially concurrently.

18. The method of claim 17 wherein all the first blocks are moved from at least one of the source fragmented areas to at least one of the target areas.

19. The method of claim 17 wherein the source and target areas are selected using a frequency distribution table for characterizing the storage space according to a predetermined distribution criteria and for selecting storage space for defragmentation purposes, whereby scanning and sorting overhead for storage space selection purposes is reduced.

20. The method of claim 19 wherein the frequency distribution table comprises a set of interval elements for identifying subsets for a total number of areas of storage space in the data storage system, and wherein the subsets of areas are identified by selection criteria, and wherein the selection criteria are selected from the group consisting of block use counts, hole counts, fragmentation percentages, and values that are functions of fragmentation percentages.

* * * * *